April 2, 1968   J. G. SHERLOCK   3,375,551
APPARATUS FOR MAKING AN OPEN-ENDED
CONTAINER HAVING A CURLED RIM
Filed April 9, 1965   2 Sheets-Sheet 1

INVENTOR
JOHN G. SHERLOCK
BY
WATSON, COLE, GRINDLE + WATSON
ATTORNEYS

United States Patent Office 3,375,551
Patented Apr. 2, 1968

3,375,551
APPARATUS FOR MAKING AN OPEN-END
CONTAINER HAVING A CURLED RIM
John Gerrard Sherlock, Feltham, England, assignor to
Continental Can Company, Inc., New York, N.Y., a
corporation of New York
Filed Apr. 9, 1965, Ser. No. 446,865
Claims priority, application Great Britain, Apr. 10, 1964,
14,986/64
4 Claims. (Cl. 18—19)

This invention relates to apparatus for making open-ended containers or other thin walled articles by moulding from sheet material. As examples of the sort of container which can conveniently be made using this invention, disposable drinking cups and food containers may be mentioned.

In the past when such containers have been formed it has been necessary to perform an additional operation to cut the surplus material from around the rim of the opening when the container has been formed from the sheet.

This has involved the provision of extra equipment such as a blanking press, either separate from or incorporated in the forming machine, and also a set of punches and dies or similar blanking equipment to match each set of forming moulds. As the majority of such disposable articles are provided with a curled bead it has also been necessary to provide additional plant and tools to carry out this curling operation subsequent to the blanking operation. The cost of such extra machinery and tools constitutes a considerable portion of the expenditure involved when setting up to manufacture this type of article. It is an object of the present invention to provide an apparatus for manufacturing thin-walled plastic containers from sheet material which eliminates the need for blanking equipment and curling equipment.

According to the present invention the mouth of the container is defined during moulding by causing the material to be formed around a sharp edge. It has been discovered that with certain plastic sheet material especially such as polystyrene, and more especially high impact polystyrenes such as styrene butadiene rubber blends and co-polymers of polybutadiene and polystyrene which may be used for moulding thin-walled articles, if, when the material has been heated beyond its softening point so that it is in a condition of "plastic flow," it is bent sharply through a large enough angle and then quickly chilled, a high degree of localised strain is created at the edge constituting the junction of the planes defining the angle under these conditions. Consequently on the direction of travel of the material through the angle being reversed when it is in the chilled condition of "non-plastic flow," the material fails and fractures at the sharp edge which is the required point of fracture.

In using a preferred apparatus according to the invention the material is moulded and formed to have a rolled-over or similar rim at the opening in the same operation in which the container is moulded and the sheet material is forced around the sharp edge at the periphery of the rolled-over rim.

The invention includes a mould for making an open ended container by the method defined above in which the mould is formed with a sharp edge defined by sides meeting at an acute angle at the opening. This edge is conveniently at the periphery of a portion of the mould shaped to define a rolled-over or similar rim for the container.

The sharp edge and the whole or a part of the portion defining the rolled-over rim—if this is used—are conveniently formed in a separate plate or mould part which can be removed and replaced by a different part so that similar containers can have different forms at the opening.

From another aspect the invention comprises an apparatus for making an open ended container or other thin-walled article by moulding from sheet material in which a rolled or similar rim is formed around an appropriately shaped portion at the mouth of the mould. This aspect of the invention includes a mould having a portion shaped to define a rolled-over or similar rim.

In the past it has been necessary to roll over the rim in a separate operation after the container has been moulded but it is contemplated that this may be done in the same operation in which the container is formed and possibly also the same operation in which the formed container is cut from the surrounding sheet.

The invention may be carried into practice in various ways and one embodiment will now be described by way of example with reference to the accompanying drawings of which:

Figure 1:
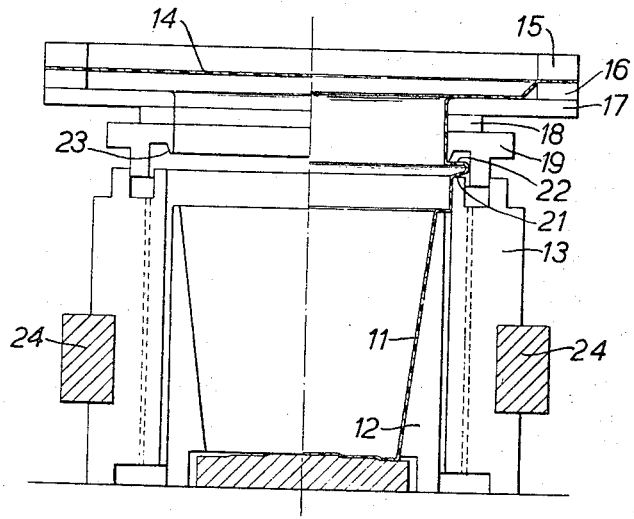
FIGURE 1 is an elevation of a moulding tool showing a cup being manufactured in accordance with the present invention; the left hand side and the right hand side of FIGURE 1 show respectively the first two stages in the formation of the cup.

The cup 11 is formed from sheet high impact polystyrene 14 which is first heated and then drawn into a mould 12 in a split shell 13 by vacuum using plug assist in the manner well known in the art which will not be described in detail in the present specification. It is sufficient to say that prior to moulding the sheet 14 is heated and clamped above the mould between upper and lower clamps 15 and 16 as shown at the left hand side of FIGURE 1. After vacuum is applied the cup is drawn into the mould as shown at 11 in the right hand side of FIGURE 1 so that the sheet material extends from the clamps 15 and 16 down on to a retaining plate 17 and thence into a central recess within the retaining plate 17, a sealing ring 18, and a top plate 19.

Thence the material extends radially outwards into the gap between the lower side of the top plate 19 and an upper shoulder 21 on the shell 13 back to the central recess in the shell 13 and thence into the mould cavity proper 12. The material is thus formed as shown at the right hand side of FIGURE 1 with an external circumferential bead 22 at what will be the open mouth of the cup.

Figure 2:
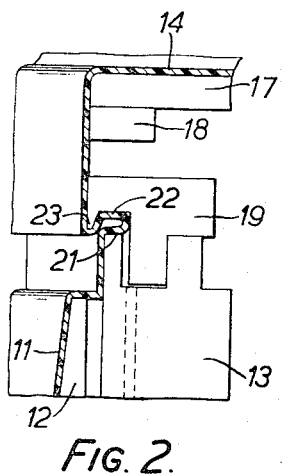
FIGURE 2 is a detail showing the next stage in the formation of the mouth of the cup.

The next stage is the lowering of the top plate 19 as shown in FIGURE 2 and this has the effect of closing the bead 22 and forming its inner end around a sharp edge of a depending ring 23 at the inner edge or annular cam surface of the top plate 19. At this stage the material has been chilled by the contact with the metal parts of the mould and shell.

Figure 3:
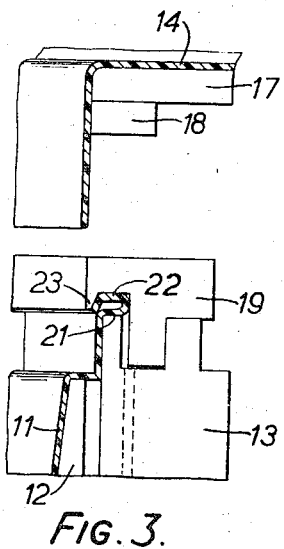
FIGURE 3 is a similar detail showing the next stage in the formation of the mouth of the cup.

Finally the mould shell and top plate 19 are lowered from the clamps 15 and 16, the retaining plate 17, and the sealing ring 18, as shown in FIGURE 3. The retaining plate 17 serves to keep the sheet material from following the mould and shell downwards and the effect is that as soon as the moulded cup in its mould starts to move downwards the material around the ring 23 starts to straighten in the direction away from the direction in which it was sharply bent. During the bending and chilling after the material had been heated to a condition of plastic flow a high degree of localised strain was created at the edge and when the cup in its mould moves downwards and the material starts to straighten it is cleanly severed at this portion of localised strain around the edge of the ring 23. This means that the cup is now formed with a curled over rim corresponding to the bead 22 and is also severed from the remainder of the sheet and this has been performed without the necessity for blanking equipment and curling equipment in addition to the moulding equipment.

The formed cup 11 can then be removed from the mould and if it was formed with a negative taper without the use of a mould 12, removal can be by splitting the shell 13 by relative sliding of the two parts along a pair of guides 24. The sheet material 14 is conveniently in a strip sufficiently wide to form one cup so that after formation the strip can then be fed futrher between the clamps 15 and 16 in preparation for forming of the next cup after it has been heated and clamped, and the mould and the top plate 19 have been returned to the position shown at the left hand side of FIGURE 1.

Figure 4:
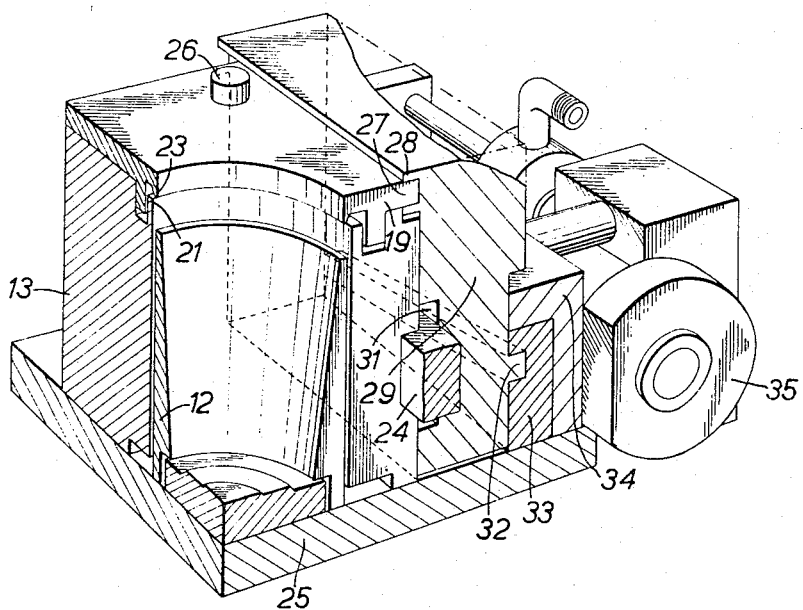
FIGURE 4 shows a perspective view of a mechanism used in performing the invention.

The mechanism for raising and lowering the top plate 19 is shown in FIGURE 4 where the one half shell 13 is shown mounted on a base plate 25. The top plate 19 is mounted for vertical sliding in relation to the mould 13 on pins 26 one of which is shown in FIGURE 4. An outwardly extending flange 27 on the top plate 19 is held in a slot formed in an inner face on an inwardly extending shoulder 28 on a lowering member 29 which can move up and down in relation to the base plate 25 and in fact is formed with an appropriate slot 31 so that it can move without interference from the guide 24.

For this purpose the lowering member 29 has an outwardly formed spline 32 inclined to the horizontal and defining a ramp surface which engages in a corresponding slot in an operating member 33 which is capable of to and fro movement parallel with the axis of the guides 24 to raise and lower the member 29.

The operating member 33 slides in a groove defined by a housing 34 secured to the base plate 25.

To and fro movement of the operating member 33 is controlled by a fluid operated servo motor shown generally at 35 having a piston which can move to and fro in response to the application of pressure fluid to one end or the other of its cylinder. The operating member 33 is mechanically coupled to the piston by a radial connection.

The equipment is arranged so that at the moment in the cycle when the top plate is to be lowered fluid is applied to the motor 35 in the direction to cause the operating member 33 to move forward as shown in FIGURE 4 to lower the lowering member 29 and the top plate 19. After formation and severing at the bead 22 fluid pressure is applied to the other end of the servo motor 35 so that the operating member moves back and the top plate is lifted again in relation to the mould and shell. The upper and lower limits of movement of the top plate 19 are in fact defined by the top of the shell 13 and the sealing ring 18 on the retaining plate 17 as can be seen best from FIGURE 1.

It can be seen from FIGURE 4 that if the shell 13 has to be split for removal of the formed cup this is easily done by sliding the two halves apart on the base plate 25 along the guides 24. That is to say the part 13 shown in FIGURE 4 moves backwards into the plane of the figure whereas the other half which is not shown moves forwards.

What we claim as our invention and desire to secure by Letters Patent is:

1. An apparatus for making an open-ended container from a sheet of plastic material and separating the same from the excess material comprising a clamp for supporting said sheet of plastic material, a mold defining the container shape positioned on one side of said sheet material, said mold including an annular plate member having an indented portion for forming a peripheral outwardly and upwardly extending curl around the mouth of said container shape, said member including an inwardly extending portion positioned above said curl, said portion having a sharp edge to form a sharp bend area of localized strain in said plastic material defining the inner limit of said curl, means for moving said plate member and said mold relative to each other and toward said curl to insure formation of said bend area in said sheet material and to substantially close said curl, and means for causing relative movement between said clamp and said mold after forming of said container to cause said plastic material to tend to straighten and thereby cleanly sever at said bend area to allow removal of said excess material.

2. The combination of claim 1 wherein is further provided guide means to cause said plate member to move in an axial direction with respect to said mold.

3. The combination of claim 1 wherein said plate member is split to allow removal of the formed container.

4. The combination of claim 1 wherein said plate member includes an annular cam surface extending from said sharp edge for closing said curl around said mouth during the movement of said member.

References Cited
UNITED STATES PATENTS

| | | | |
|---|---|---|---|
| 2,749,726 | 6/1956 | Nowak | 264—92 X |
| 3,004,285 | 10/1961 | Hagen | 264—163 X |
| 3,004,288 | 10/1961 | Gardner | 264—93 |
| 3,011,212 | 12/1961 | Marshall et al. | |
| 3,173,174 | 3/1965 | Edwards | 18—19 |
| 3,142,089 | 7/1964 | Wilkalis et al. | 264—161 X |
| 3,172,588 | 3/1965 | Bertold et al. | |
| 3,190,946 | 6/1965 | Keyes | 264—161 X |
| 3,267,521 | 8/1966 | Koster | 18—19 |

FOREIGN PATENTS 1,337,903  8/1963  France.

ROBERT F. WHITE, *Primary Examiner.*
A. R. NOË, *Assistant Examiner.*